United States Patent

Wu

[11] Patent Number: 4,614,465
[45] Date of Patent: Sep. 30, 1986

[54] CAVITY KEY DUPLICATING MACHINE

[76] Inventor: Kuo-shen Wu, No. 10, Alley 14, Lane 74, Pa Te Road, Section 3, Taipei, Taiwan

[21] Appl. No.: 576,734

[22] Filed: Mar. 2, 1984

[51] Int. Cl.[4] .............................................. B23C 3/35
[52] U.S. Cl. ......................................... 409/81; 76/110
[58] Field of Search ............... 409/81, 82, 83; 76/110; 29/76 C

[56] References Cited

U.S. PATENT DOCUMENTS 3,388,619 6/1968 Schreiber et al. ..................... 409/81

FOREIGN PATENT DOCUMENTS 3147248 3/1983 Fed. Rep. of Germany ........ 409/81

Primary Examiner—William R. Briggs
Attorney, Agent, or Firm—Birch, Stewart, Kolasch & Birch

[57] ABSTRACT

A cavity key duplicating machine having an upright drill which may be moved upward and downward and has an adjustable stroke, an upright guide which may be moved upward and downward together with the upright drill, as well as the left and right vises secured on an upper carriage slidably secured on a lower carriage slidably secured on a base. A ring-shaped stroke adjuster is releasably secured on a pinion shaft rotatably secured on a case, and having an inner pin formed thereof in order that the inner pin can be stopped by a fixed pin mounted on the side of the case when it is rotated by the pinion shaft for the control of the stroke of the upright drill.

3 Claims, 8 Drawing Figures

CAVITY KEY DUPLICATING MACHINE

BACKGROUND OF THE INVENTION

The present invention relates to a cavity key duplicating machine, and more particularly to an improved cavity key duplicating machine having an upright drill which may be moved upward and downward and has an adjustable stroke, an upright guide which may be moved upward and downward together with the upright drill, and the left and right vises secured on an upper carriage slidably secured on a lower carriage slidably secured on a base.

Since the cavity keys have a lot of cavities formed on the surface thereof, and in order to form cavities for the purpose of duplicating such keys, an upright drilling machine should be used for drilling cavities by means of a measurement. However, it is difficult to effect such cavities drilling due to the fact that each cavity key has its unique arrangement concerning the positions and depths of the cavities. Therefore, a high degree of key duplicating can not be obtained.

SUMMARY OF THE INVENTION

An object of the present invention is to provide an improved cavity type key duplicating machine comprising an upright drill which may be moved upward and downward for drilling cavities in a key blank held by a right vise arranged below the drill and secured on an upper carriage slidably secured on a lower carriage slidably secured on a base, a stroke adjuster for enabling said drill to be moved downward to a predetermined position in order to avoid over drilling of the key blank, an upright guide which may be moved upward and downward together with said drill by means of an arm extension in order that when the upright guide is inserted in the cavity of the key sample held by a left vise arranged below the upright guide and secured on an upper carriage slidably secured on an upper carriage slidably secured on a lower carriage slidably secured on a base, the upright drill can drill an identical cavity in the key blank.

Another object of the present invention is to provide an improved cavity key duplicating machine having a pair of left and right vises which comprise a fixed jaw having a flight of steps e.g. two steps for supporting key sample, a movable jaw having a flight of steps having a smaller width than that of the above said steps, and a screw disposed between the fixed jaw and movable jaw for driving the movable jaw towards the fixed jaw for holding key sample or key blank.

BRIEF DESCRIPTION OF THE DRAWINGS

An embodiment of the present invention will now be described by way of example with reference to the accompanying drawings in which.

DETAILED DESCRIPTION OF THE DRAWINGS

Figure 1:
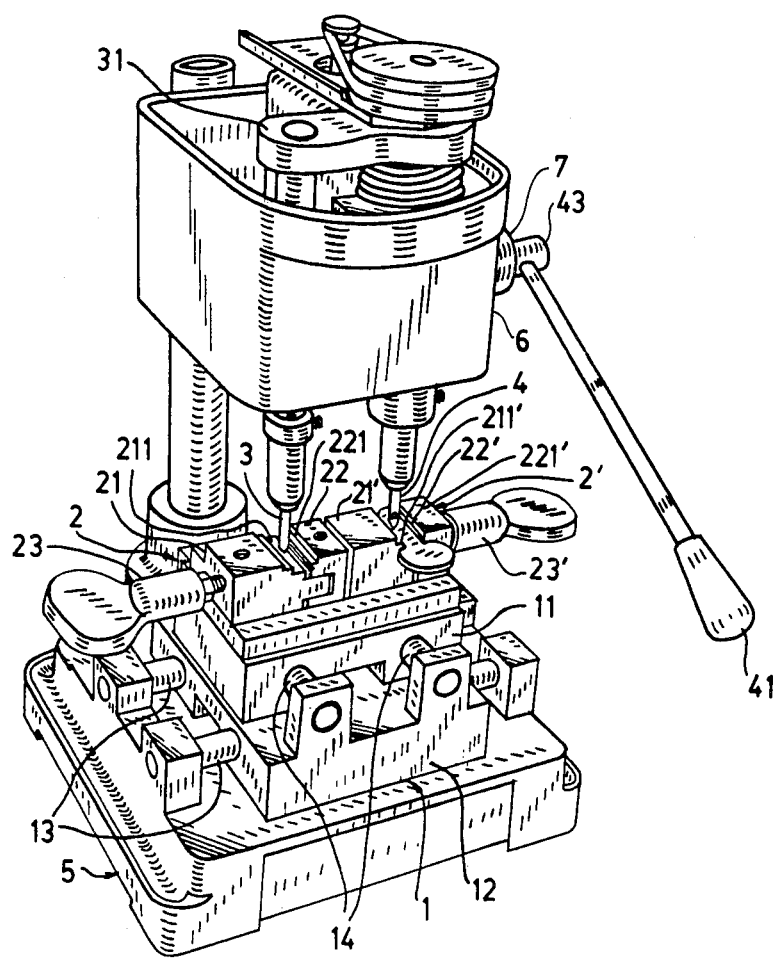
FIG. 1 is a perspective view of an embodiment of a cavity key duplicating machine in accordance with the present invention with the top cover removed so as to show concealed construction better.

Referring now to FIGS. 1 to 8, the cavity key duplicating machine of this invention comprises of a carriage 1, a pair of left and right vises 2 and 2', an upright drill 4, an upright guide 3 and a case 6 etc. The carriage 1 comprises an upper carriage 11 and a lower carriage 12. The lower carriage 12 is formed in a substantial rectangle, and slidably secured on a base 5 by means of a pair of guide posts 13 horizontally, laterally and parallelly supported on the base 5. The upper carriage 11 is slidably secured on the lower carriage 12 by means of a pair of guide posts 14 horizontally, longitudinally and parallelly supported on the lower carriage 12. Obviously, the carriage 1 can be moved to a desired position along the lateral and longitudinal guide posts in order to enable the left and right vises which are mounted on the upper carriage to be moved to a suitable position below the upright guide and drill.

Figure 4:
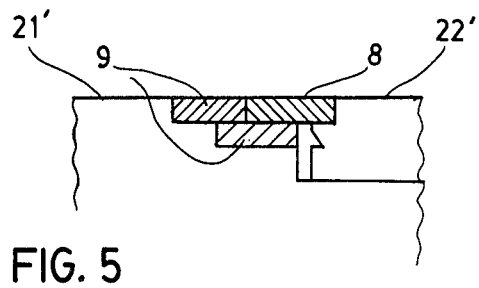
FIG. 4 is a partial enlarged view of the vise in accordance with the present invention, showing one type of the key blank held therein.
Figure 5:
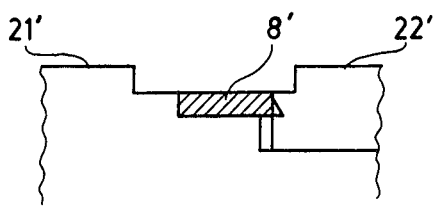
FIG. 5 is a partial enlarged view of the vise in accordance with the present invention, showing another type of the key blank held therein.
Figure 6:
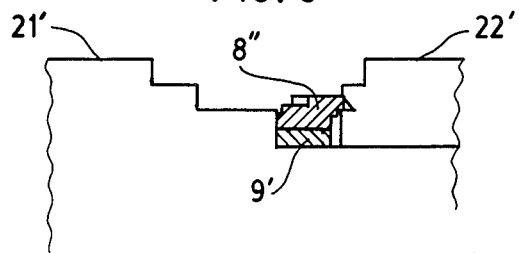
FIG. 6 is a partial enlarged view of the vise in accordance with the present invention, showing another type of the key blank held therein.
Figure 7:
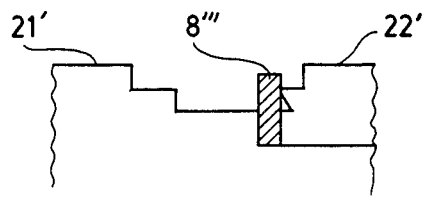
FIG. 7 is a partial enlarged view of the vise in accordance with the present invention, showing another type of the key blank therein.

Left and right vises each comprises a fixed jaw 21(21') having a flight of steps 211(211') for supporting key sample as shown in FIGS. 4–6, a movable jaw having a flight of steps 221(221') having a smaller width than that of the above said steps 211(211'), and a screw disposed between the fixed jaw and movable jaw for driving the movable jaw towards the fixed jaw in order to hold various key samples (8,8',8" and 8"') or key blanks firmly as shown in FIGS. 4–7. A Z-shaped key blank can be held by the vise due to the fact that key blank can be positioned on the step of the vise per se or by means of a spacer (9 or 9') without the aid of hand. This can not be attained by the conventional vise because there are no steps having enough width to support key blanks in the conventional vise. The fixed jaws 2 and 2' have an adjoining extension 24 formed intergrally for use as a guide for movable jaw.

The upright drill 4 has a power-feeding mechanism (not shown) similar to that of the conventional upright drilling machine in order that the upright drill its self can be rotated and moved upward and downward by means of a pinion (42) which is rotatably secured on the case 6. A stroke adjuster (7) is formed in a ring shape and releasably secured on the pinion shaft 43 of the pinion 42 by means of a screw 44 in order that it can be rotated by the pinion shaft 43.

Figure 2:
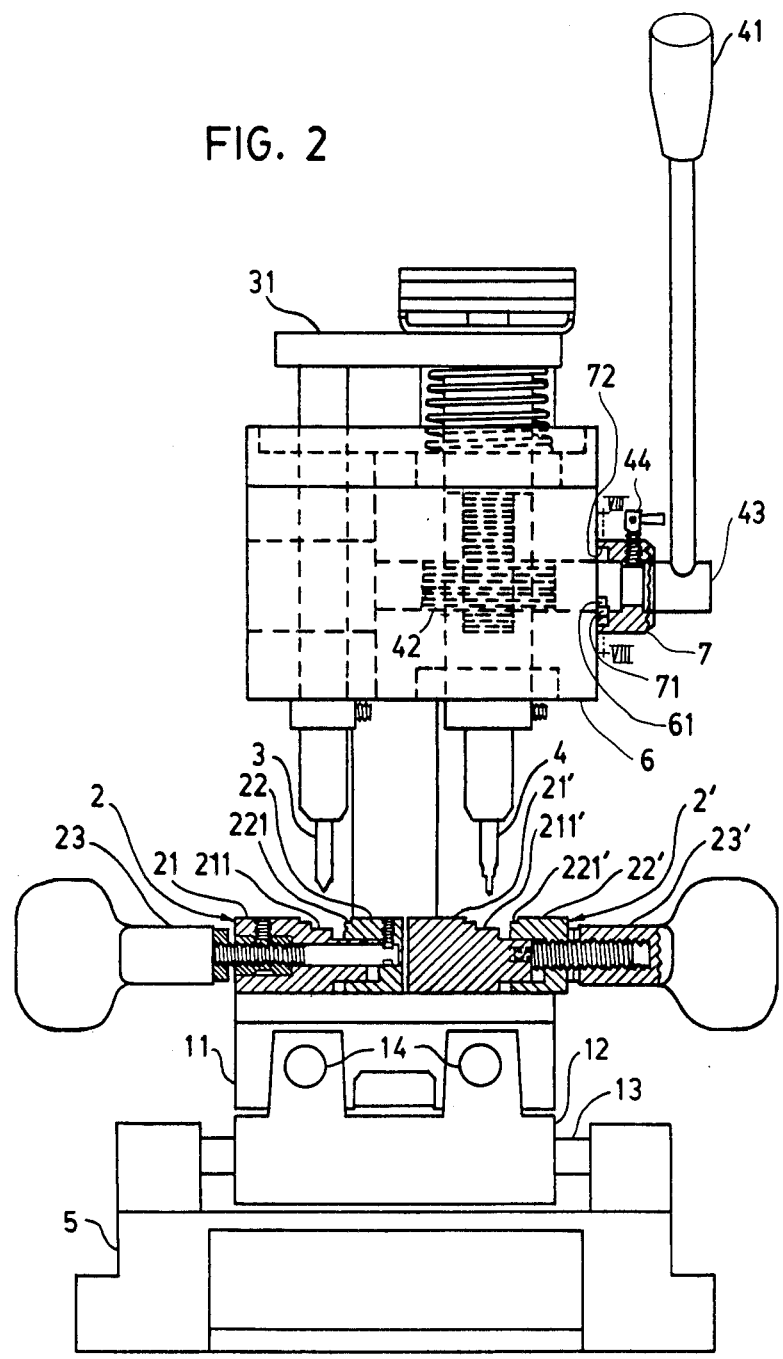
FIG. 2 is a partial front elevational view of the cavity key duplicating machine of FIG. 1.
Figure 3:
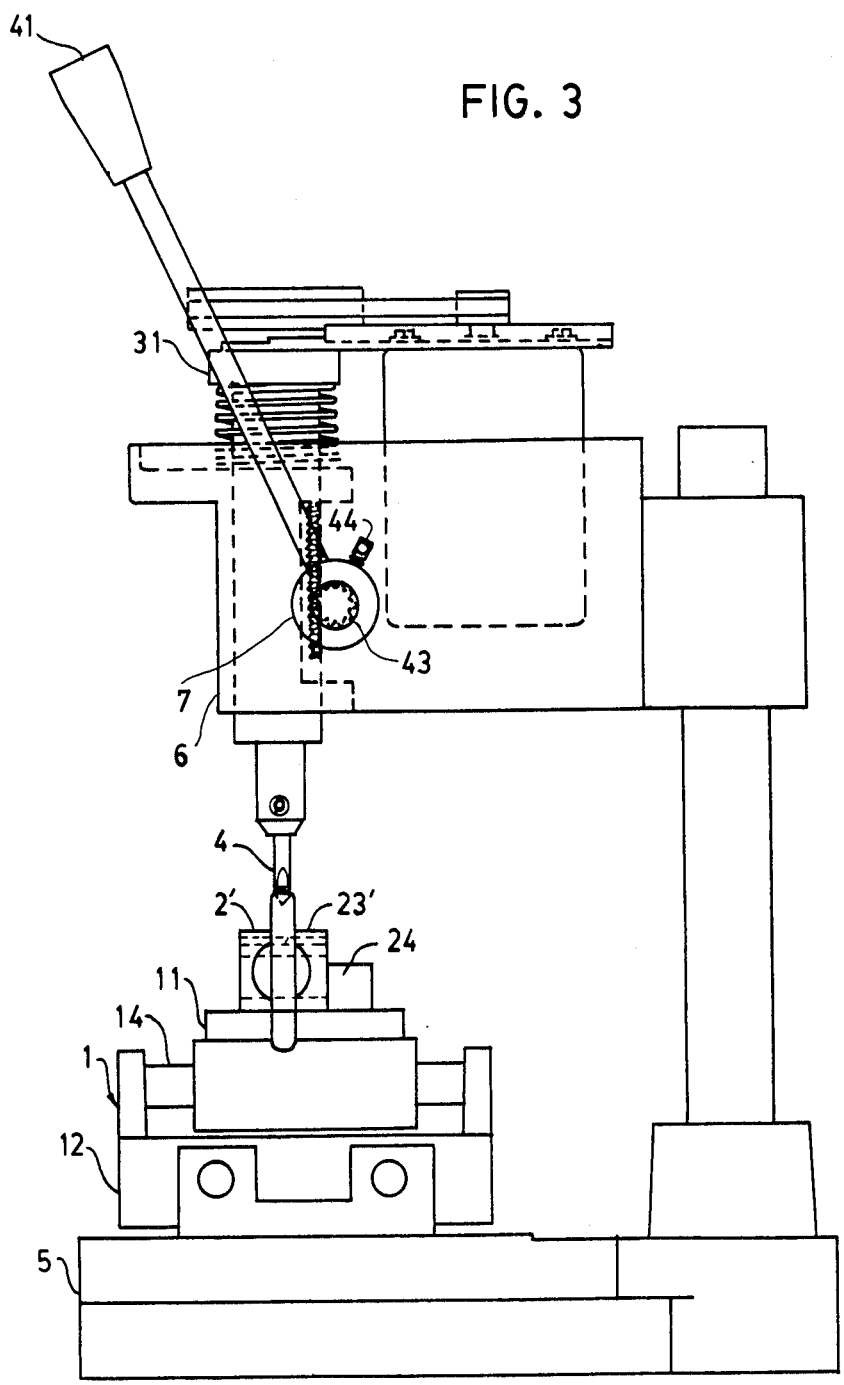
FIG. 3 is a side view of the cavity key duplicating machine of FIG. 1.
Figure 8:
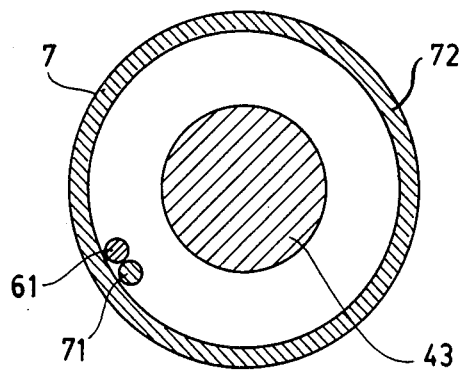
FIG. 8 is an enlarged sectional view taken along line VIII—VIII of FIG. 2.

Referring now to FIGS. 2 and 8, the stroke adjuster 7 is provided with an inner pin 71 adjacent to the outer ring 72 there of in order that the inner pin 71 can be stopped at a suitable position by a fixed pin (61) mounted on the side of the case 6 when it is rotated together with the stroke adjuster 7 by the pinion shaft 43 for the control of stroke of the upright drill 4 i.e. to enable the upright drill to be moved downward to a predetermined position in order to avoid over drilling of the key blank. A different stroke of the upright drill 4 can be obtained if the amount of the angular movement of the inner pin 71 is changed by means of resecuring of the stroke adjuster 7.

The upright guide 3 is uprightly mounted on an arm extension 41 which is horizontally extended from the upper end of the upright drill 4 in order that it can be moved upward and downward together with the upright drill 4. The end of the upright guide 3 is formed in a cone shape for insertion into the cavity of the key sample and can be arranged in a same level as the edge end of the upright drill 4. The distance between upright guide 3 and drill 4 is arranged equal to the distance between left and right vises, in order that when the end of the guide is inserted in the cavity of the key sample held by the left vise 2, the upright drill can cut an identical cavity in the key blank held by the right vise 2'.

I claim:

1. A cavity key duplicating machine comprising:

a base, a lower carriage mounted on said base, an upper carriage mounted on said lower carriage, a pair of left and right vises mounted on said upper carriage for holding a key sample and a key blank, a case mounted on said base, an upright guide carried by said case, an upright drill carried by said case, said lower carriage is slidably secured on said base by means of a first pair of guide posts horizontally, laterally and parallely supported on said base, said upper carriage is slidably secured on said lower carriage by means of a second pair of guide post horizontally, longitudinally and parallelly supported on said lower carriage in order that said pair of left and right vises can be moved to a desired position by movement of said upper and lower carriages along said pairs of guide posts, said upright guide is uprightly mounted on an arm extension extended from the upper end of said upright drill in order to be moved upward and downward together with said upright drill by means of a pinion rotatably secured on said case and a rack mounted on said upright drill, so that when said upright guide is inserted in a cavity of said key sample, said upright drill can drill an identical cavity in said key blank, and said pair of left and right vises each comprises a fixed jaw having a flight of steps for supporting a key sample, a movable jaw having a flight of steps having a smaller width than that of the said steps in said fixed jaw, and a screw disposed between said fixed jaw and movable jaw for driving said movable jaw towards said fixed jaw in order to hold various key samples or key blanks.

2. A cavity key duplicating machine comprising:

a base, a lower carriage mounted on said base, an upper carriage mounted on said lower carriage, a pair of left and right vises mounted on said upper carriage for holding a key sample and a key blank, a case mounted on said base, an upright drill carried by said case, said lower carriage is slidably secured on said base by means of a first pair of guide posts horizontally, laterally and parallelly supported on said base, said upper carriage is slidably secured on said lower carriage by means of a second pair of guide post horizontally, longitudinally and parallelly supported on said lower carriage in order that said pair of left and right vises can be moved to a desired position by movement of said upper and lower carriages along said pairs of guide posts, said upright guide is uprightly mounted on an arm extension extended from the upper end of said upright drill in order to be moved upward and downward together with said upright drill by means of a pinion rotatably secured on said case and a rack mounted on said upright drill, so that when said upright guide is inserted in a cavity of said key sample, said upright drill can drill an identical cavity in said key blank, and a ring-shaped stroke adjuster releasably secured on a pinion shaft rotatably secured on said case and having an inner pin formed thereof in order that said inner pin can be stopped by a fixed pin mounted on the side of said case when it is rotated by said pinion shaft for the control of the stroke of said upright drill.

3. A cavity key duplicating machine as claimed in claim 1, wherein said fixed jaw has an adjoining extension formed integrally for use as a guide for said movable jaw.

* * * * *